Dec. 23, 1952     M. H. GROVE     2,622,619
FLEXIBLE TUBE VALVE WITH LIQUID
LINK CONNECTED OPERATOR
Filed Oct. 26, 1948     2 SHEETS—SHEET 1
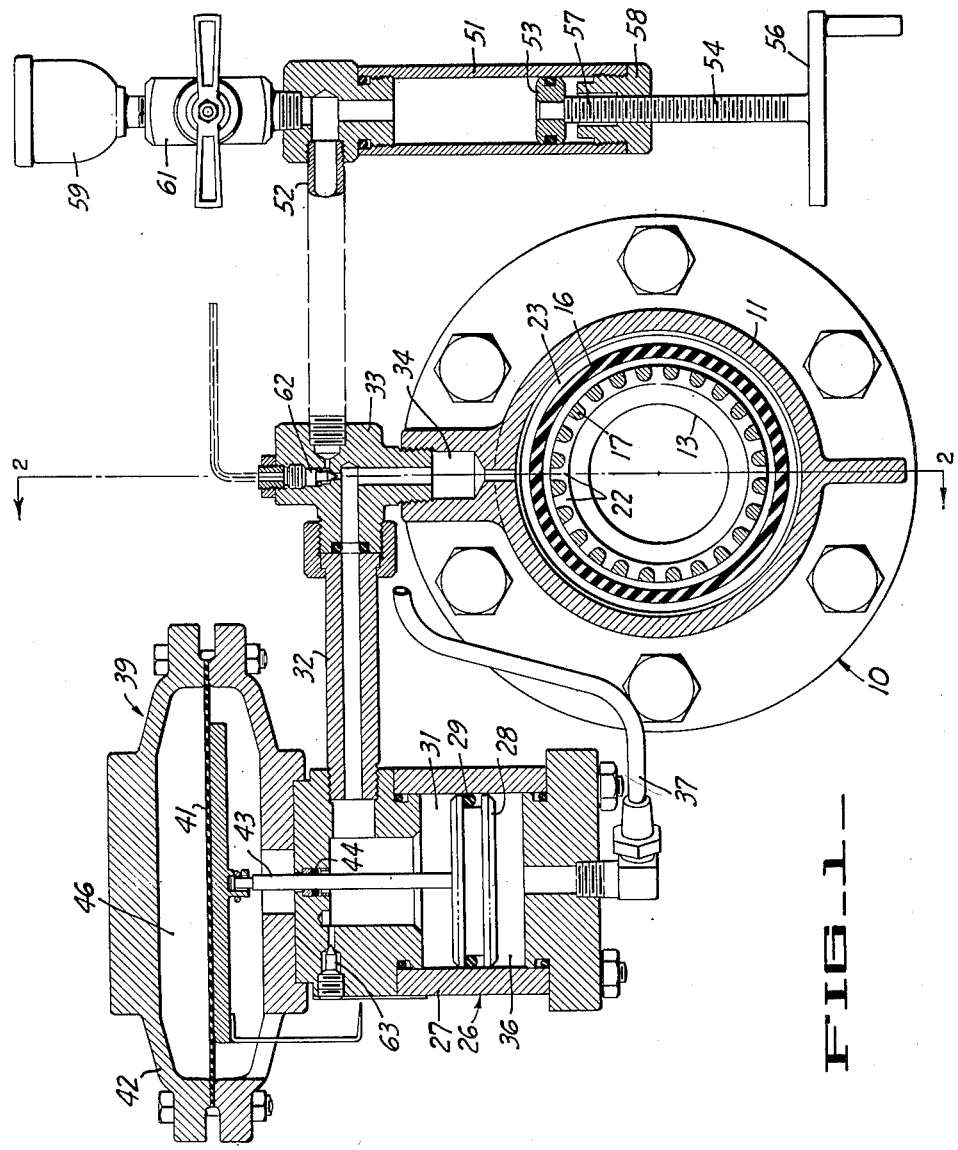
FIG.1.—
INVENTOR
BY *Marvin H. Grove*
ATTORNEYS

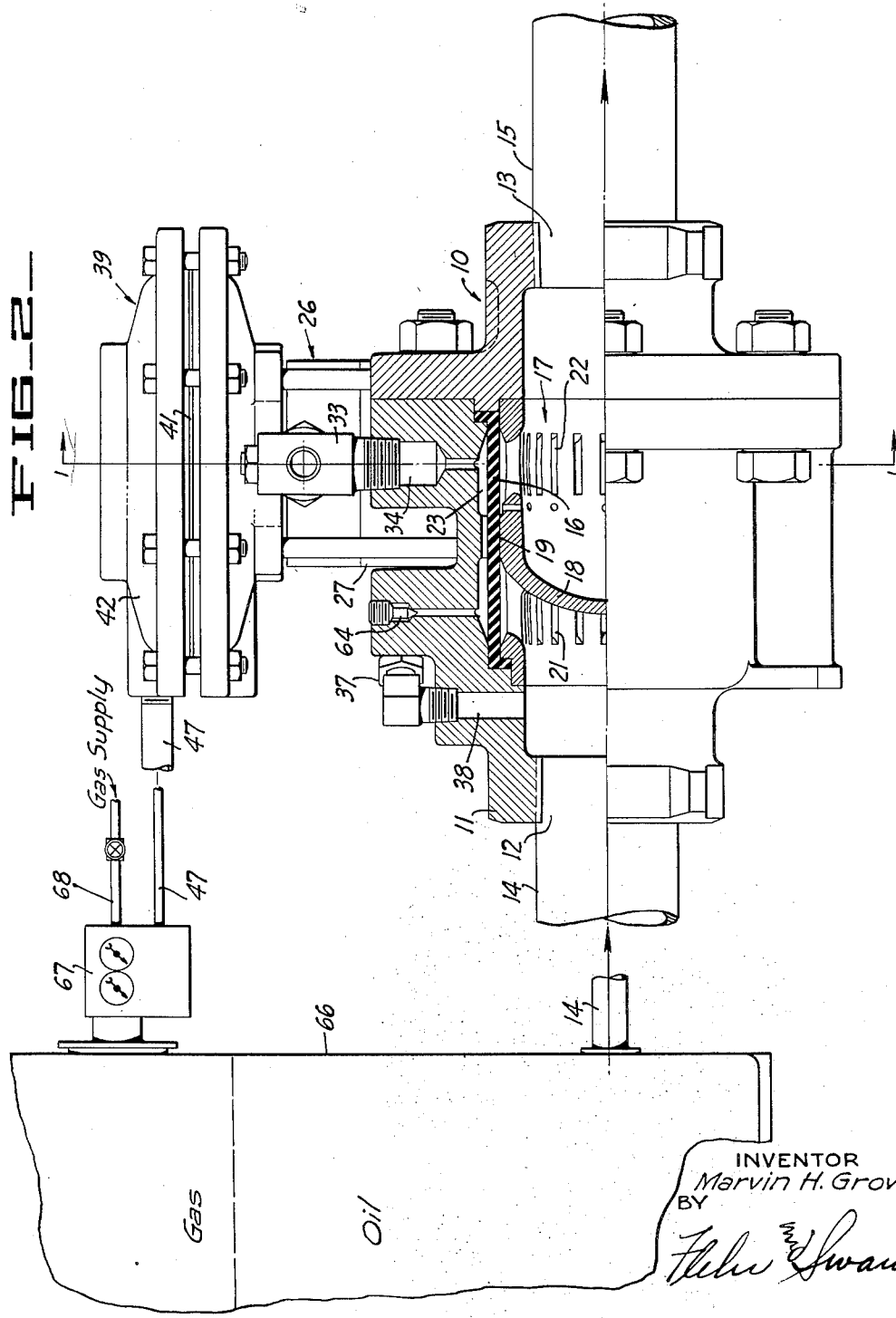

Patented Dec. 23, 1952

2,622,619

UNITED STATES PATENT OFFICE 2,622,619

FLEXIBLE TUBE VALVE WITH LIQUID LINK CONNECTED OPERATOR

Marvin H. Grove, Piedmont, Calif., assignor, by mesne assignments, to Grove Regulator Company, a corporation of California Application October 26, 1948, Serial No. 56,643

3 Claims. (Cl. 137—677)

This invention relates generally to fluid flow control apparatus adapted to control the flow of fluid from a tank or like source of fluid under pressure. The invention is particularly applicable to controlling flow of liquids and can be employed to advantage for the removal of oil from oil-gas separators such as are used in the petroleum industry.

It is an object of the present invention to provide apparatus of the above character which can be controlled automatically and which can be applied to relatively high pressures of the order of 1000 p. s. i. or more, without rapid deterioration of the primary control valve, and with tight shut-off when the primary valve is closed.

Another object of the invention is to provide a control apparatus of the above character making use of a primary valve of the expansible tube type, together with relatively simple automatic control means for the same.

Another object of the invention is to provide a novel arrangement for the automatic control of a valve of the expansible tube type, which is characterized by the fact that the controlling forces required may be of a relatively low value, while the pressures being applied to the expansible tube valve may be relatively high.

In general the present invention makes use of a primary valve of the expansible tube type, together with hydraulic operating means having a liquid connection with the closed chamber which surrounds the expansible tube. The movable liquid displacement member of the hydraulic operator is balanced with respect to the inflow pressure applied to the primary valve, and is operatively connected with supplemental control means.

Further objects and features of the invention will appear from the following description in which the preferred embodiment has been illustrated in detail in conjunction with the accompanying drawing.

Referring to the drawing:

Figure 1 is a side elevational view in section, illustrating valve apparatus employing the present invention.

Figure 2 is a sectional view taken along the line 2—2 of Figure 1, but likewise showing application of the apparatus to an oil-gas separator.

The apparatus shown in Figures 1 and 2 of the drawing consists of a primary valve 10 of the expansible tube type, and which may be constructed as disclosed in Patent Nos. 2,331,291, 2,353,143 and 2,360,873. As illustrated the valve consists of a body 11 having inflow and outflow passages 12 and 13 which are connected to the associated piping 14 and 15. Within the body there is a tube 16 formed of suitable resilient material, such as natural or synthetic rubber, and which has its ends clamped and sealed with respect to the body about the inflow and outflow passages. The tube 16 surrounds a core 17 which includes the annular barrier 18. The barrier is provided with an annular sealing surface 19 adapted to engage the inner periphery of the tube 16. The end portions of the core which extend from both sides of the barrier 18 are provided with slots 21 and 22, through which the flow occurs when the tube is expanded with respect to the barrier.

A closed annular chamber 23 surrounds the tube 16, and fluid pressure applied to this chamber tends to cause the tube to collapse upon the barrier. As explained in the aforesaid patents, application of fluid pressure to the inflow passage 12 tends to expand the tube 16 away from the annular sealing surface 19 to permit flow of fluid. When the pressure in the chamber 23 is about equal to or greater than the inflow pressure, the tube 16 is held closed against the barrier, and therefore no flow occurs. However when the pressure in chamber 23 drops to a value substantially below the inflow pressure, the tube expands radially to permit flow to occur about the barrier 18.

In conjunction with the primary valve 10, I provide the hydraulic operator 26 (Figure 1). This hydraulic operator consists of a cylinder 27, fitted with the piston 28. The piston may be sealed by suitable means such as the resilient O ring 29. The chamber 31 on one side of the piston 28 has a closed connection by pipe 32, fitting 33 and duct 34, with the chamber 23 about the expansible tube.

The closed chamber 36 upon the other side of the piston 28 is connected by pipe 37 to the inflow passage 12 by way of duct 38 (Figure 2). Thus inflow pressure is applied to the lower side of piston 28 as viewed in Figure 1, while the upper side applies pressure to liquid within the chamber 31.

As means for applying controlling forces to the piston 28 to move the same, I provide the diaphragm assembly 39, which includes the flexible fluid pressure operated diaphragm 41 and the mounting body 42. The diaphragm 41 is operatively connected with rod 43, which has a direct connection with the piston 28. Leakage about the rod 43 is prevented by suitable means such as the packing gland 44. The chamber 46 upon one side of the diaphragm 41 is in communication with a pipe 47 through which controlling pressures are applied.

In Figure 1 supplemental means is illustrated to facilitate complete filling of the hydraulic operator and its associated connections with oil or like liquid. Thus a small cylinder 51 has its one end connected by pipe 52 with the fitting 33. A piston 53, fitted in cylinder 51, is connected to an operating rod 54, which in turn is provided with the handle 56. Because of the threaded engagement 57 between rod 54 and the end cylinder closure 58, turning of rod 54 serves to advance or retract the piston 53 a small amount for each revolution thereof. Above the cylinder 51 there is a small liquid cup 59 which has its lower end connected with the upper end of the cylinder 51 through the valve cock 61. By opening a small needle valve 62 in the fitting 33, liquid can be admitted from pipe 52 into the pipe 32 and duct 34. Small bleed valves 63 and 64 are provided for bleeding air from different points of the hydraulic system.

In Figure 2 my apparatus is shown operatively connected with the tank 66 of an oil-gas separator. The pipe 14, which leads to the primary valve 10, connects with the lower portion of the tank 66. A controlling device 67 has a connection with the tank, and the pipe connection 68 to a source of air or other gas under pressure. Pipe 47 also connects with the controlling device 67. Device 67 can be what is known as a pneumatic liquid level pilot, which operates responsive to varying levels of oil in tank 66 to apply corresponding controlling pressures to pipe 47. For example in a typical instance the variation of oil level in the tank 66 between upper or lower limits of a normal range may cause a corresponding variation in pressure applied to pipe 47 of from 2 to 20 p. s. i. While the nature of device 67 may vary in different instances, in a typical instance it may utilize a controlling valve of the supply and waste type, which in turn is operated by a diaphragm or like fluid pressure operated member responsive to variations in pressure from the tank 66, such as are caused by changes in the oil level.

Operation of my apparatus can now be described as follows: Care is taken to completely fill the hydraulic system with liquid. The liquid, such as a suitable oil, can initially be applied through the filling cup 59 and valve cock 61. During filling the bleed valves 63 and 64 can be opened to permit escape of air. Assuming now that the apparatus is connected as shown in Figure 2 to the tank 66 of a gas-oil separator, such as are employed in the petroleum industry for the separation of casing head gas from petroleum, the full pressure in the tank is applied through pipe 14 to the inflow side of the primary valve 10. This may for example be of the order of 1000 p. s. i. or more. Neglecting the force which may be applied by diaphragm 41 upon the piston 28, this piston is urged in one direction by the inflow pressure applied through pipe 37 and it acts upon the liquid in chamber 31, to apply hydraulic pressure to the exterior surface of the expansible tube 16. Assuming that the fluid pressure areas upon both sides of the piston 28 are nearly equal, then the resulting fluid pressure applied about the tube 16 is substantially equal to the inflow pressure applied to the passage 12. Therefore the tube 16 will be held closed against the annular sealing surface 19 of the barrier 18 and no flow will occur. Actually the fluid pressure area of the upper side of the piston is slightly reduced by the rod 43 so that the inflow pressure applied below the piston will produce a slightly greater pressure above the piston and in chamber 23.

As the oil level rises in the tank 66 pneumatic pressure applied through pipe 47 to one side of the diaphragm 41 (beyond the minimum limit of say 2 p. s. i.) causes this diaphragm to apply force against the piston 28 to unbalance and move the same. The net effect is to reduce the liquid pressure in chamber 31 and in the chamber 23 about the expansible tube 16. Thus the tube 16 is permitted to expand to displace a certain amount of oil from chamber 23 and to permit limited flow about the barrier. Should the oil level continue to increase, higher controlling pressure is applied through pipe 47 to further unbalance the piston 28. This permits the tube 16 to expand a further amount to permit greater flow. For the higher limit of the controlling pressure, the tube 16 may expand the full permissible amount for maximum flow.

The apparatus described above is highly effective for controlling fluid flow under relatively severe service conditions, as for example controlling the discharge of oil from an oil-gas separator as previously described. The expansible tube type of valve is capable of effective throttling action without excessive cutting due to the presence of sand or like gritty material. The use of a hydraulic system for controlling a valve of the expansible tube type facilitates adaptation of the apparatus to relatively low values of controlling pressure, and in addition it enables positive control over the expansion and contraction of the tube 16 with apparatus of simple design.

While it is desirable to use the apparatus as a throttling type of control, it is possible by the use of a suitable device 67 to use the apparatus as a full open and closed type of control. In this instance the device 67 furnishes only two values of controlling pressure, one being minimum and the other maximum. For minimum value the pressure applied to the piston 28 is insufficient to affect the pressure in chamber 23, and therefore the tube 16 remains closed. However for maximum pressure value the piston 28 is forced downwardly, and thus the tube 16 is permitted to expand to its full open position.

It will be apparent that the effective volumetric capacity of chamber 31, and the displacement area of piston 28, must be appropriate for the volumetric capacity of the chamber 23 which surrounds the tube 16. In other words for the normal travel of the piston 28, the volumetric displacement should be sufficient to effect opening and closing of tube 16.

For remote automatic control it is desirable to provide a diaphragm assembly 39 or like fluid pressure operated device for applying force to the piston 28. However where manual operation is desired it is evident that the piston may be connected to suitable manual operating means, such as a stem associated with a hand wheel and nut for moving the stem longitudinally to a desired position.

I claim:

1. In valve apparatus for controlling flow of fluid from a source of fluid under pressure, a valve of the type including a body having inflow and outflow passages and a resilient tube adapted to be expanded by fluid pressure to permit flow through the body and to be contracted by fluid pressure applied to a chamber about the tube to reduce flow through the body, a hydraulic operator including a cylinder and a piston operating therein, a closed chamber upon one side of said piston having a closed liquid connection with the chamber about said tube, said liquid connection and said two latter chambers being filled wtih liquid, means for applying fluid pressure from the inflow side of the valve to the other side of said piston, and means for applying forces to said piston to move the same to effect control of said valve.

2. In valve apparatus for controlling flow of fluid from a source of fluid under pressure, a valve of the type including a body having inflow and outflow passages and a resilient tube adapted to be expanded by fluid pressure to permit flow through the body and to be contracted by fluid pressure applied to a chamber about the tube to reduce flow through the body, a hydraulic operator including a movable liquid displacement member and means forming closed fluid chambers on opposite sides of said member, means serving to connect the chamber on one side of said member with the inflow side of said valve, means forming a liquid connection between the chamber on the other side of said member and the chamber formed about the tube, said liquid connection and said two latter chambers being filled with liquid, and means for applying operating motion to said fluid displacement member to effect control of said valve.

3. In valve apparatus for controlling flow of fluid from a source of fluid under pressure, a valve of the type including a body having inflow and outflow passages and a resilient tube adapted to be expanded by fluid pressure to permit flow through the body and to be contracted by fluid pressure applied to a chamber about the tube to reduce flow through the body, a hydraulic operator including a movable liquid displacement member and means forming a closed chamber on one side of said member, a liquid connection between said last named chamber and the chamber about the tube, said liquid connection and said chambers being filled with liquid, and means for applying balancing force to said member responsive to pressure in the inflow passage and increasing in direct relation with an increase in said pressure, and means for applying motion to said displacement member.

MARVIN H. GROVE.

REFERENCES CITED

The following references are of record in the file of this patent:

UNITED STATES PATENTS

| Number | Name | Date |
|---|---|---|
| 1,163,541 | Hultin | Dec. 7, 1915 |
| 2,328,902 | Grove | Sept. 7, 1943 |

FOREIGN PATENTS

| Number | Country | Date |
|---|---|---|
| 972 | Great Britain | of 1865 |